(12) United States Patent
Kanegae et al.

(10) Patent No.: US 11,407,373 B2
(45) Date of Patent: Aug. 9, 2022

(54) OCCUPANT PROTECTION DEVICE

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 46 days.

(21) Appl. No.: 16/899,666

(22) Filed: Jun. 12, 2020

(65) Prior Publication Data

US 2021/0024028 A1 Jan. 28, 2021

(30) Foreign Application Priority Data

Jul. 22, 2019 (JP) .............................. JP2019-134726

(51) Int. Cl.
*B60R 21/233* (2006.01)
*B60R 21/0134* (2006.01)
*B60R 21/015* (2006.01)
*B60R 21/205* (2011.01)
*B60R 21/00* (2006.01)
(Continued)

(52) U.S. Cl.
CPC ........ *B60R 21/233* (2013.01); *B60R 21/0134* (2013.01); *B60R 21/01552* (2014.10); *B60R 21/205* (2013.01); *B60R 2021/0041* (2013.01); *B60R 2021/01013* (2013.01); *B60R 2021/23107* (2013.01)

(58) Field of Classification Search
CPC .................................................. B60R 21/233
See application file for complete search history.

(56) References Cited

U.S. PATENT DOCUMENTS

| 5,835,613 | A | * | 11/1998 | Breed | ................... | B60Q 1/143 |
| | | | | | | 382/100 |
| 9,796,353 | B2 | * | 10/2017 | Fujiwara | ............. | B60R 21/2155 |
| 10,926,736 | B2 | * | 2/2021 | Robertson | ........... | B60R 21/2338 |

(Continued)

FOREIGN PATENT DOCUMENTS

| CN | 113002475 A | * | 6/2021 | ....... | B60R 21/23138 |
| DE | 102020207723 A1 | * | 1/2021 | ....... | B60R 21/01552 |

(Continued)

*Primary Examiner* — Nicole T Verley
(74) *Attorney, Agent, or Firm* — Smith, Gambrell & Russell, LLP (57) ABSTRACT

An occupant protection device for a vehicle includes a collision predictor, a main airbag, and a deployment controller. The collision predictor is configured to predict a collision of the vehicle. The main airbag is configured to deploy toward an occupant from a front of the vehicle when a collision of the vehicle is predicted by the collision predictor. The main airbag includes a first deployment part, an arm-push-away deployment part, and a second deployment part. The controller is configured to cause the main airbag to deploy toward the occupant when a collision of the vehicle is predicted by the collision predictor. The controller is configured to, when a collision of the vehicle is predicted by the collision predictor, cause the first deployment part to deploy, subsequently cause the arm-push-away deployment part to deploy to push an arm of the occupant away, and thereafter, cause the second deployment part to deploy.

15 Claims, 8 Drawing Sheets

(51) Int. Cl.
*B60R 21/01* (2006.01)
*B60R 21/231* (2011.01)

(56) References Cited

U.S. PATENT DOCUMENTS

| | | | | |
|---|---|---|---|---|
| 11,084,452 | B2* | 8/2021 | Nagasawa | B60R 21/231 |
| 2007/0267852 | A1* | 11/2007 | Enders | B60R 21/0132 |
| | | | | 280/730.1 |
| 2010/0019473 | A1* | 1/2010 | Dennis | B60R 21/2338 |
| | | | | 280/729 |
| 2011/0140398 | A1* | 6/2011 | Song | B60R 21/233 |
| | | | | 280/729 |
| 2015/0091278 | A1* | 4/2015 | Yasuoka | B60R 21/2334 |
| | | | | 280/729 |
| 2018/0001863 | A1* | 1/2018 | Nakanishi | B60R 21/205 |
| 2018/0050651 | A1* | 2/2018 | Fu | B60R 21/237 |
| 2018/0065590 | A1* | 3/2018 | Jindal | B60R 21/231 |
| 2018/0111581 | A1* | 4/2018 | Wang | B60R 21/233 |
| 2018/0111583 | A1* | 4/2018 | Jaradi | B60R 21/235 |
| 2018/0281731 | A1* | 10/2018 | Hotta | B60R 21/233 |
| 2019/0023214 | A1* | 1/2019 | Kitagawa | B60R 21/01552 |
| 2019/0061676 | A1* | 2/2019 | Kwon | B60R 21/233 |
| 2019/0077357 | A1* | 3/2019 | Rupp | B60R 21/0136 |
| 2019/0161050 | A1* | 5/2019 | Schneider | B60R 21/2338 |
| 2019/0241146 | A1* | 8/2019 | Okada | B60R 21/235 |
| 2019/0283700 | A1* | 9/2019 | Kwon | B60R 21/2338 |
| 2019/0291681 | A1* | 9/2019 | Nakajima | B60R 21/231 |
| 2019/0381968 | A1* | 12/2019 | Kwon | B60R 21/233 |
| 2020/0114855 | A1* | 4/2020 | Deng | B60R 21/233 |
| 2020/0223390 | A1* | 7/2020 | Munoz Melgar | B60R 21/231 |
| 2020/0238937 | A1* | 7/2020 | Saso | B60N 2/4221 |
| 2021/0039578 | A1* | 2/2021 | Rupp | B60R 21/23138 |
| 2021/0354654 | A1* | 11/2021 | Lee | B60R 21/233 |

FOREIGN PATENT DOCUMENTS

| | | | | |
|---|---|---|---|---|
| EP | 3666603 A1 | * | 6/2020 | ....... B60R 21/23138 |
| JP | 2017178148 A | * | 10/2017 | |
| JP | 2018030399 A | * | 3/2018 | ....... B60R 21/23138 |
| JP | 2018-052441 A | | 4/2018 | |
| JP | 2018161974 A | * | 10/2018 | |
| JP | 2018172003 A | * | 11/2018 | |
| JP | 6626764 B2 | * | 12/2019 | |
| JP | 2021017130 A | * | 2/2021 | |
| KR | 20210116813 A | * | 3/2020 | |
| WO | WO-2004050435 A1 | * | 6/2004 | ........... B60R 21/214 |
| WO | WO-2019058837 A1 | * | 3/2019 | ........... B60R 21/233 |
| WO | WO-2019107053 A1 | * | 6/2019 | ........... B60R 21/207 |

* cited by examiner

OCCUPANT PROTECTION DEVICE

CROSS-REFERENCE TO RELATED APPLICATIONS

The present application claims priority from Japanese Patent Application No. 2019-134726 filed on Jul. 22, 2019, the entire contents of which are hereby incorporated by reference.

The disclosure relates to an occupant protection device.

To protect an occupant from a collision and so on, a vehicle, such as an automobile, is provided with an airbag device as an occupant protection device.

The airbag device is typically constituted by an impact sensor, an inflator, an airbag, a control device, and so on. In the airbag device, when the impact sensor detects the impact of, for example, a front collision, the impact sensor outputs a detection signal to the control device, the control device sends an activation signal to the inflator, and the inflator generates gas and sends the gas to the airbag. The airbag is instantaneously inflated with the gas sent from the inflator and deploys in front of the occupant. Accordingly, the airbag holds the body of the occupant moving forward due to the impact with the gas pressure inside thereof and deflates while absorbing the kinetic energy. Consequently, abrupt forward movement of the occupant caused by the impact exerted by, for example, the front collision of the automobile is slowed by the airbag, and the safety of the occupant is ensured.

Currently, autonomous driving technology is being studied. In a vehicle employing such autonomous driving, the travel state of the vehicle is controlled regardless of the intention of an occupant, such as the driver. Accordingly, an occupant protection device for such an autonomous driving vehicle is being proposed. This vehicle occupant protection device includes a front airbag that deploys in front of the upper body of the occupant. The front airbag has a shoulder-rest recess in a part with which the shoulder in the upper body of the occupant moving forward from the seating position comes into contact so that the shoulder fits in the shoulder-rest recess. Accordingly, even if the upper body of the occupant sitting in the seat moves forward from the seating position before a collision during autonomous driving of the vehicle, the shoulder in the upper body is supported by the shoulder-rest recess so as to protect the occupant. In the vehicle occupant protection device, the front airbag has an inclined surface that extends from the shoulder-rest recess toward one side in the vehicle width direction such that the inclined surface on the one side is located backward relative to the inclined surface on the other side. Accordingly, the entire upper body that moves forward in a diagonal posture in which the shoulder on the other side is located forward relative to the shoulder on the one side can be held and supported by the inclined surface of the front airbag, the entire upper body can be supported in a stable state, and the impact can be absorbed in the stable state (see Japanese Unexamined Patent Application Publication No. 2018-052441).

SUMMARY

An aspect of the disclosure provides an occupant protection device for a vehicle, the occupant protection device including a collision predictor, a main airbag, and a deployment controller. The collision predictor is configured to predict a collision of the vehicle. The main airbag is configured to deploy toward an occupant from a front of the vehicle when a collision of the vehicle is predicted by the collision predictor. The main airbag includes a first deployment part, an arm-push-away deployment part, and a second deployment part. The deployment controller is configured to cause the main airbag to deploy toward the occupant when a collision of the vehicle is predicted by the collision predictor, the deployment controller is configured to, when a collision of the vehicle is predicted by the collision predictor, cause the first deployment part to deploy, subsequently cause the arm-push-away deployment part to deploy to push an arm of the occupant away, and thereafter, cause the second deployment part to deploy.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 3A-1 to FIG. 3D-2 schematically illustrate a main airbag device, where FIG. 3A-1 to FIG. 3D-1 are side views and FIG. 3A-2 to FIG. 3D-2 are top views;

FIG. 8A-1 to FIG. 8D-2 schematically illustrate the main airbag device according to yet still another embodiment, where FIG. 8A-1 to FIG. 8D-1 are side views and FIG. 8A-2 to FIG. 8D-2 are top views.

DETAILED DESCRIPTION

With the widespread and full-scale use of autonomous driving, the riding state of an occupant becomes more flexible. Accordingly, for example, even when the occupant is sitting in the driver's seat, the occupant may be holding a portable terminal or the like in their hand during traveling of the vehicle. Currently, an occupant sitting in a seat other than the driver's seat may be holding a portable terminal or the like in their hand during traveling of the vehicle.

In a case where an occupant is holding a portable terminal or the like when the front airbag deploys toward the occupant, for example, the arm of the occupant is sandwiched between the front airbag and the upper body of the occupant, and it is difficult to provide optimum occupant protection.

Accordingly, it is desirable to provide an occupant protection device that can provide optimum occupant protection even in a case where an occupant is holding a portable terminal or the like.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
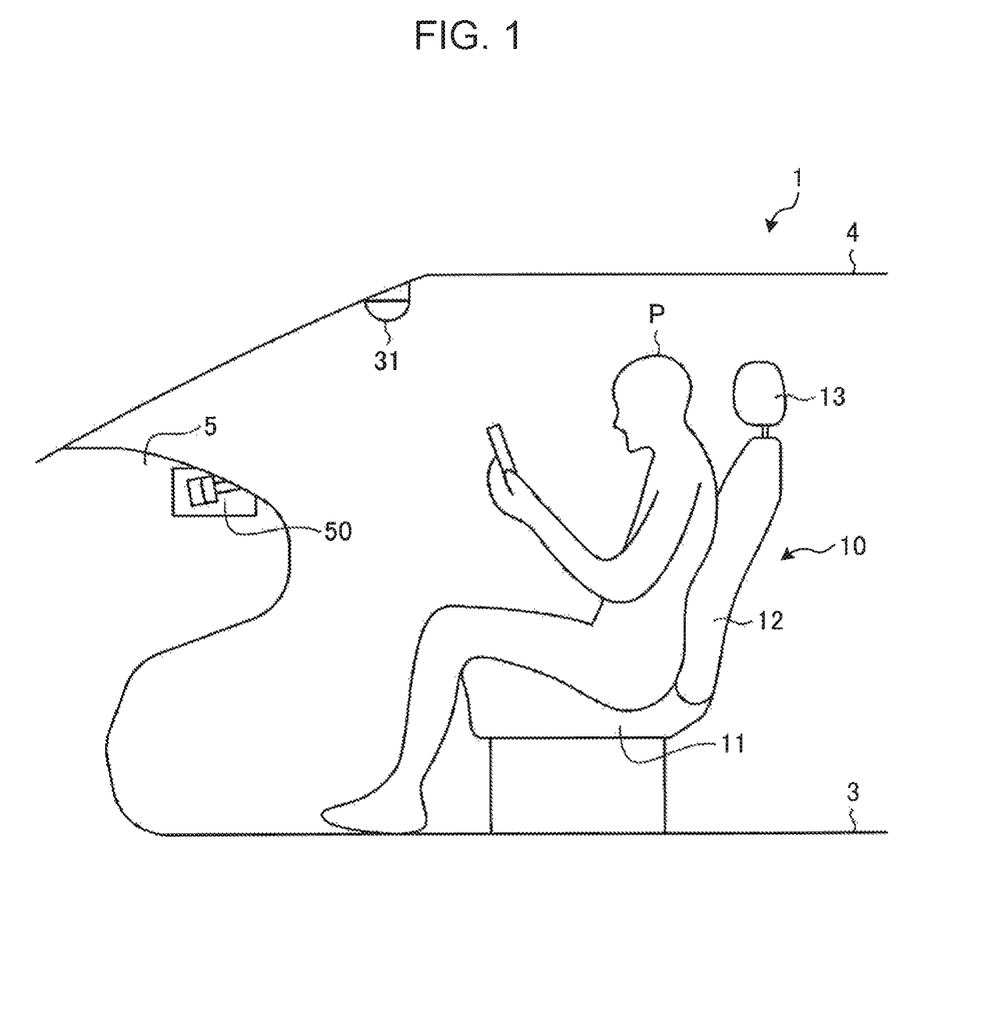
FIG. 1 is a cross-sectional view and illustrates part of a vehicle provided with an occupant protection device according to an embodiment of the disclosure.
Figure 2:
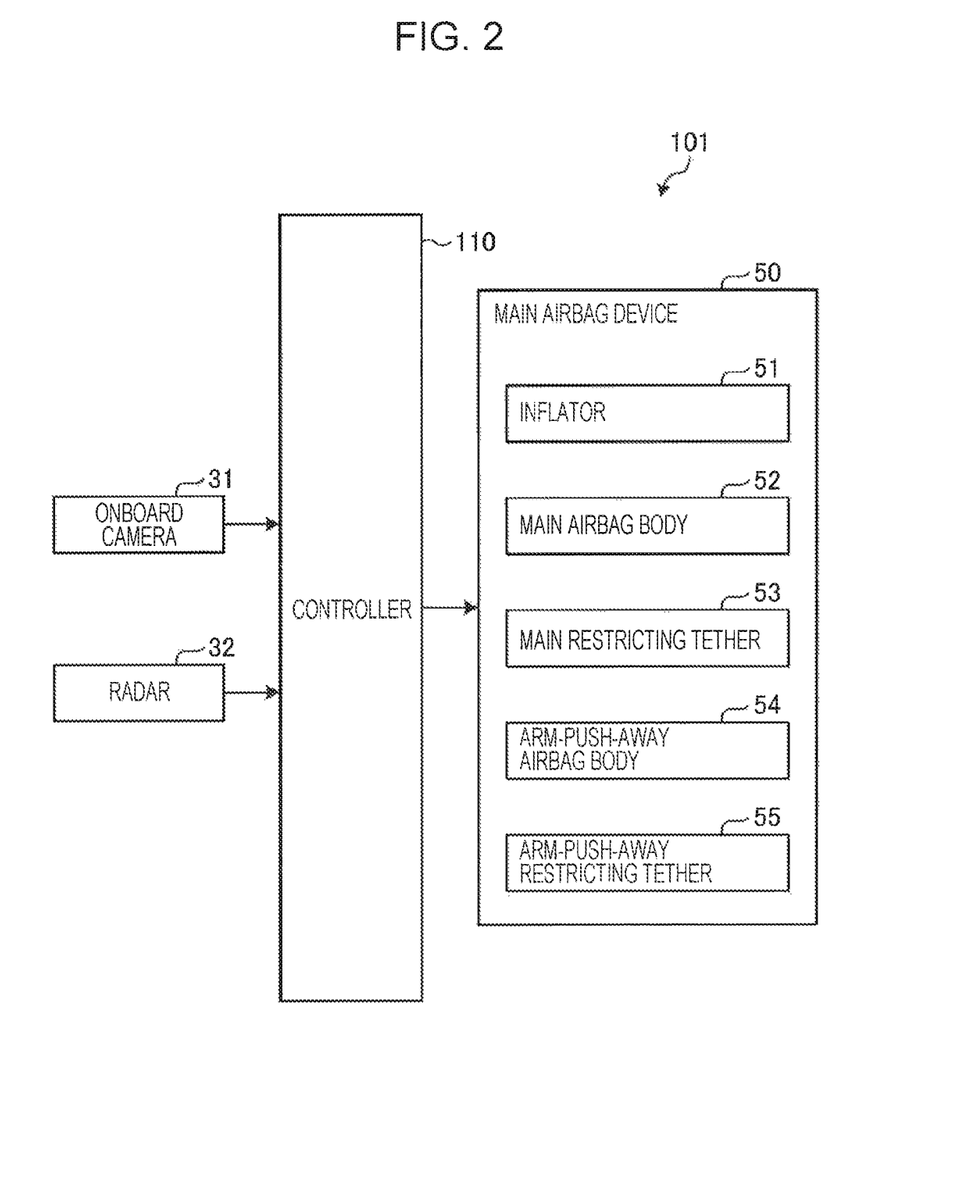
FIG. 2 is a schematic block diagram of the occupant protection device according to the embodiment of the disclosure.
Figure 3A:
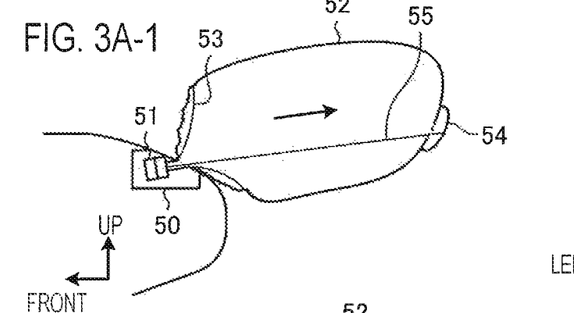
Figure 3A:
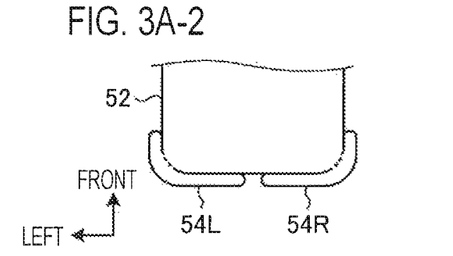
Figures 3B, 3B:
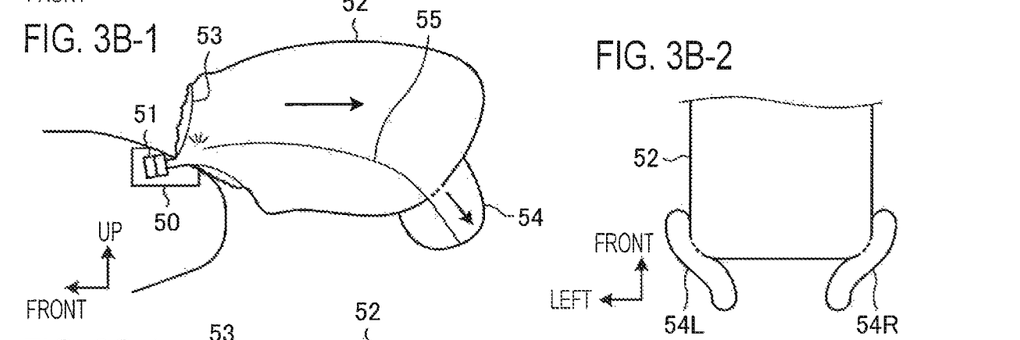
Figures 3C, 3C, 3D, 3D:
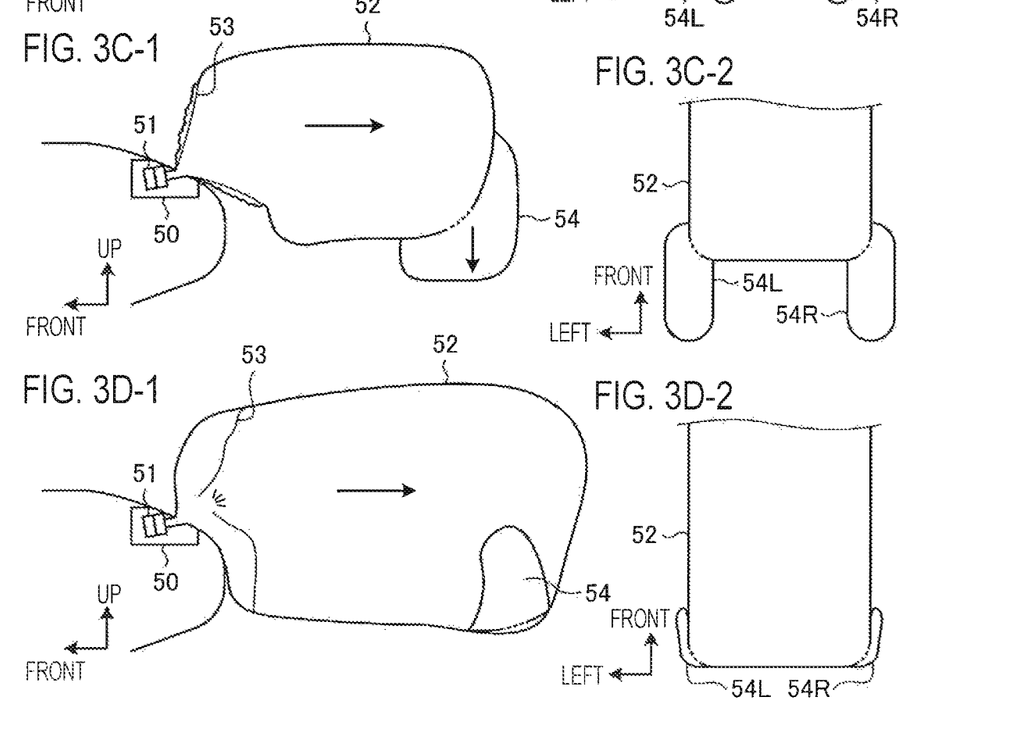
Figure 4A:
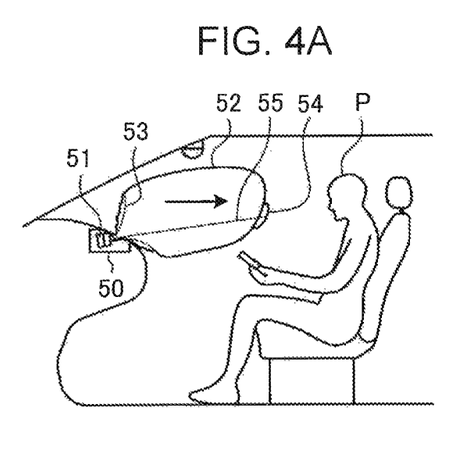
FIG. 4A to FIG. 4D are side views and illustrate the course of deployment of airbag bodies.
Figure 4B:
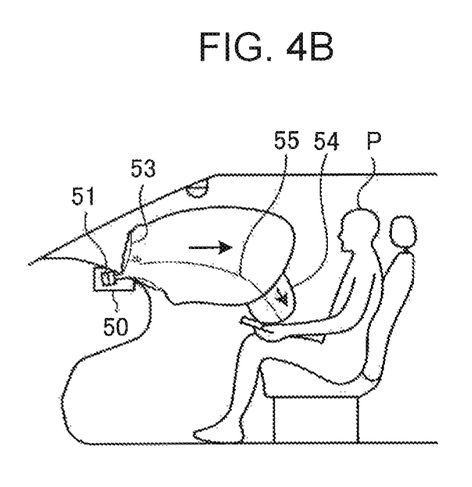
Figure 4C:
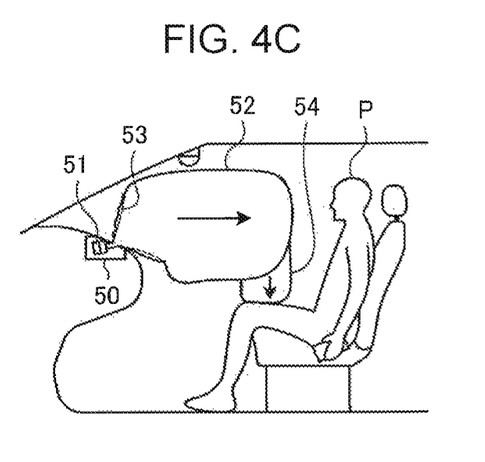
Figure 4D:
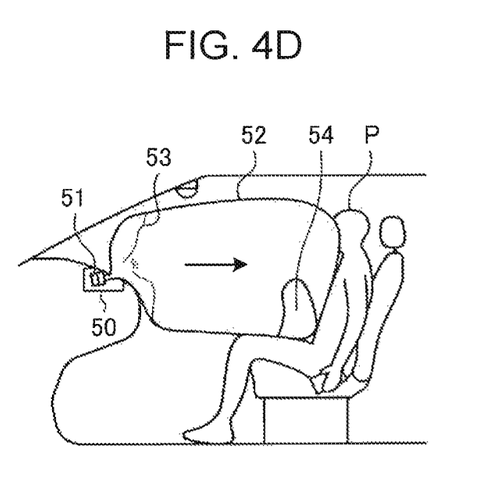
Figure 5:
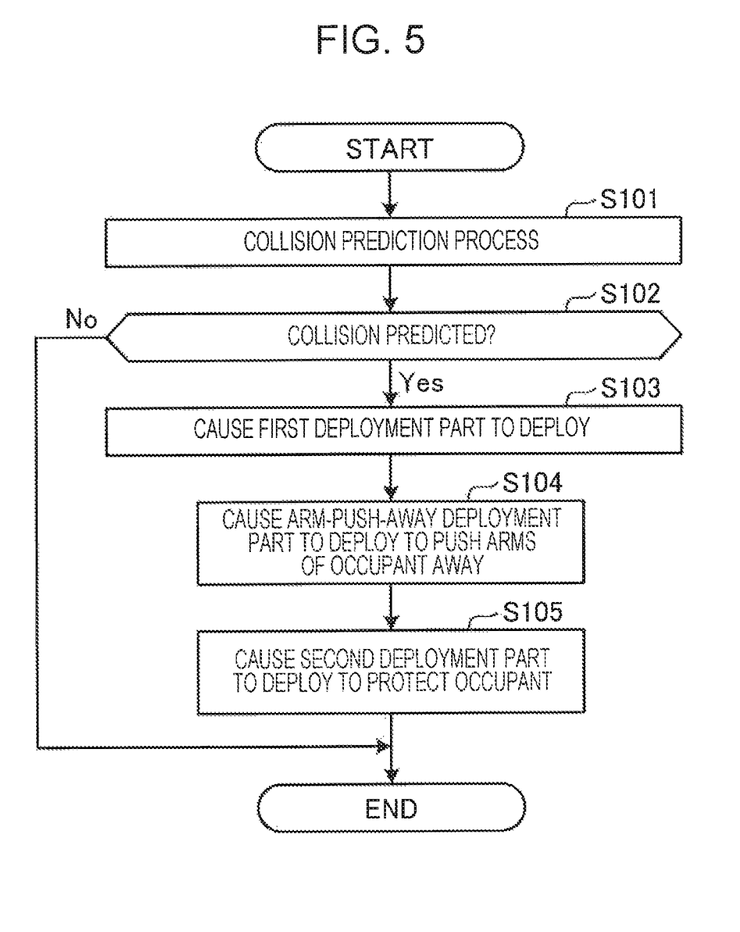
FIG. 5 is a flowchart illustrating overall operations of the occupant protection device.

FIG. 1 is a cross-sectional view and illustrates part of a vehicle provided with an occupant protection device according to an embodiment of the disclosure. FIG. 2 is a schematic block diagram of the occupant protection device according to the embodiment of the disclosure. FIG. 3A-1 to FIG. 3D-2 schematically illustrate a main airbag device according to the embodiment, where FIG. 3A-1 to FIG. 3D-1 are side views and FIG. 3A-2 to FIG. 3D-2 are top views. FIG. 4A to FIG. 4D are side views and illustrate the course of deployment of airbag bodies when the occupant protection device according to the embodiment is activated. FIG. 5 is a flowchart illustrating overall operations of the occupant protection device.

Configuration of Vehicle 1

As illustrated in FIG. 1, in the occupant compartment of a vehicle 1, a floor 3 is provided in the lower part and a roof 4 is provided in the upper part. On the floor 3, a seat 10 is disposed. The vehicle 1 is further provided with an occupant protection device 101 described below.

The seat 10 is a seat for an occupant P to be seated while the occupant P is riding in the vehicle 1. The seat 10 includes a seat cushion 11 (seat) that supports the buttocks to the femoral region of the occupant P, a seatback 12 (backrest) that is provided so as to be reclinable, and a headrest 13 (head part) that supports the head of the occupant P.

Configuration of Occupant Protection Device 101

As illustrated in FIG. 2, the occupant protection device 101 includes an onboard camera 31, a radar 32, a main airbag device 50, and a controller 110. The main airbag device 50 is provided in a dashboard 5.

As described below, the controller 110 has functions of an airbag deployment control unit (also referred to as "airbag control unit (ACU)") that detects a collision or collision prediction of the vehicle 1 on the basis of information input from the onboard camera 31 and the radar 32 and controls deployment of airbag bodies provided in the main airbag device 50. The controller 110 may be provided as part of a vehicle control device (hereinafter referred to as "electronic control unit (ECU)") that controls the vehicle 1 as a whole.

Onboard Camera 31

The onboard camera 31 is capable of capturing images of scenes outside and inside the vehicle 1. For example, the onboard camera 31 captures images of the environment around the vehicle 1, such as scenes ahead of, behind, and on the sides of the vehicle 1. The onboard camera 31 captures an image of the inside of the vehicle so that the seating state of the occupant P sitting in the seat 10, such as the position of the arm or hand of the occupant P, is known. Image information about the captured image is input to the controller 110, recorded to a random access memory (RAM) of the controller 110, and analyzed by the controller 110. Accordingly, the controller 110 can recognize the situation around the vehicle 1 (the situation outside the vehicle) in real time or in a follow-up manner. The controller 110 can recognize the situation inside the vehicle, such as the state of the occupant P, in real time or in a follow-up manner. Examples of the state of the occupant P include the position of the arm or hand of the occupant P.

Radar 32

The radar 32 emits a radio wave to detect an object, such as an obstacle, and measure the distance to and the direction of the object. The radar 32 is installed on the front bumper or the rear bumper of the vehicle 1 so as to enable, for example, front monitoring, side monitoring, and rear monitoring for the vehicle 1. Monitoring information is input to the controller 110, recorded to the RAM of the controller 110, and analyzed by the controller 110. Accordingly, the controller 110 can recognize the situation around the vehicle 1 in real time or in a follow-up manner.

In this embodiment, the onboard camera 31 and the radar 32 are provided, and information from both the onboard camera 31 and the radar 32 is used to predict a collision; however, this embodiment is not limited to this, and either one of the onboard camera 31 and the radar 32 may be used or another device may be used. In this embodiment, the situation inside the vehicle, that is, information about the state of the occupant P, is obtained by using image information obtained by the onboard camera 31; however, this embodiment is not limited to this, and a human detecting sensor or the like may be used.

Main Airbag Device 50

The main airbag device 50 is controlled by the controller 110 to protect the occupant P from the impact of a collision. As illustrated in FIG. 3A-1 to FIG. 3D-1, the main airbag device 50 includes an inflator 51, a main airbag body 52, a main restricting tether 53, an arm-push-away airbag body 54, and an arm-push-away restricting tether 55.

Inflator 51

The inflator 51 ignites gunpowder in response to an activation signal based on collision detection or collision prediction of the vehicle 1 by the controller 110 to generate gas from a chemical reaction caused by burning. The gas generated by the inflator 51 is injected into the main airbag body 52.

Main Airbag Body 52

The main airbag body 52 is a bag body into which gas is injected by the inflator 51. The main airbag body 52 is folded up small when not activated. When gas is injected from the inflator 51, the main airbag body 52 inflates and deploys from the dashboard 5 toward the seat 10 to reduce the impact of the collision of the vehicle 1 on the head, chest, and so on of the occupant P. That is, when a collision of the vehicle 1 is predicted by the controller 110, the main airbag body 52 deploys from the front of the vehicle 1 toward the occupant P.

As described below, the main airbag body 52 is restricted by the main restricting tether 53 such that the deployment range thereof is separated into two stages. That is, the main airbag body 52 includes a first deployment part that deploys in a state where the main airbag body 52 is restricted by the main restricting tether 53 and a second deployment part that deploys in a case where restriction by the main restricting tether 53 is removed. The main airbag body 52 does not restrain the occupant P in a state where the first deployment part deploys, but restrains the occupant P in a state where the second deployment part also deploys. A state where only the first deployment part of the main airbag body 52 deploys is called a first deployment state, and a state where both the first deployment part and the second deployment part of the main airbag body 52 deploy is called a maximum deployment state.

Main Restricting Tether 53

The main restricting tether 53 couples part of the main airbag body 52 (for example, a part near the base of the first deployment part) and the inflator 51 with each other. Accordingly, the main restricting tether 53 restricts the deployment range of the main airbag body 52. The main restricting tether 53 is cut by the inflator 51 in accordance with control by the controller 110. When the main restricting tether 53 is cut while gas is injected into the main airbag body 52 by the inflator 51, deployment restriction is removed, and the deployment range of the main airbag body 52 is expanded (from the first deployment state to the maximum deployment state).

Arm-Push-Away Airbag Body 54

The arm-push-away airbag body 54 is provided at the distal end of the main airbag body 52. The arm-push-away airbag body 54 is a bag body into which gas output from the inflator 51 is injected via the main airbag body 52, and is folded up small when not activated. Deployment of the arm-push-away airbag body 54 is limited also by the arm-push-away restricting tether 55. When restriction by the arm-push-away restricting tether 55 is removed, the arm-push-away airbag body 54 deploys and pushes away the arms of the occupant P downward. That is, the arm-push-away airbag body 54 pushes the arms of the occupant P away.

In the main airbag device 50, the arm-push-away airbag body 54 is called an arm-push-away deployment part similarly to the first deployment part and the second deployment part of the main airbag body 52.

The arm-push-away airbag body 54 includes a left arm-push-away airbag body 54L that deploys outward to the left and a right arm-push-away airbag body 54R that deploys outward to the right. At the time of deployment, the left arm-push-away airbag body 54L and the right arm-push-away airbag body 54R deploy so as to open to the left and to the right respectively to thereby push away the respective arms of the occupant P downward and outward to the left and to the right respectively. Accordingly, the arm-push-away airbag body 54 flicks the arms of the occupant P to thereby remove the arms from the deployment area of the main airbag body 52.

Arm-Push-Away Restricting Tether 55

The arm-push-away restricting tether 55 couples part of the arm-push-away airbag body 54 (for example, the distal end part of the arm-push-away airbag body 54) and the inflator 51 with each other. Accordingly, the arm-push-away restricting tether 55 restricts deployment of the arm-push-away airbag body 54. The arm-push-away restricting tether 55 is cut by the inflator 51 in accordance with control by the controller 110. When the arm-push-away restricting tether 55 is cut while gas is injected into the main airbag body 52 by the inflator 51, deployment restriction is removed, the gas is injected into the arm-push-away airbag body 54 from the main airbag body 52, and the arm-push-away airbag body 54 deploys. That is, the arm-push-away deployment part deploys.

Controller 110

The controller 110 controls operations of the occupant protection device 101. The controller 110 includes a central processing unit (CPU), a read-only memory (ROM) that stores a control program executed by the CPU, a data table, commands, data, and so on, the RAM that temporarily stores data, an electrically erasable and programmable read-only memory (EEPROM) formed of a rewritable non-volatile memory, and an input-output interface circuit. The controller 110 centrally controls the occupant protection device 101.

The controller 110 is coupled to the onboard camera 31, the radar 32, the main airbag device 50, and the ECU not illustrated via the input-output interface circuit.

The controller 110 performs collision prediction and collision determination for the vehicle 1 on the basis of information input from the onboard camera 31 and the radar 32.

An acceleration sensor (G sensor), a distance sensor, an impact sensor (pressure sensor), and the like may be used, and the controller 110 may perform collision prediction and collision determination on the basis of information input from these devices instead of the information input from the onboard camera 31 and the radar 32.

The controller 110 controls the main airbag device 50 to deploy the main airbag body 52 and limit (restrict) the deployment. The controller 110 controls the main airbag device 50 to deploy the arm-push-away airbag body 54 and limit (restrict) the deployment. For example, the controller 110 performs activation control for the inflator 51 of the main airbag device 50 and cut control for the main restricting tether 53 and the arm-push-away restricting tether 55.

When predicting a collision of the vehicle 1, the controller 110 activates the inflator 51 to cause the main airbag body 52 to deploy, and thereafter, causes the inflator 51 to cut the arm-push-away restricting tether 55, thereby pushing the arms of the occupant P away. Thereafter, the controller 110 causes the inflator 51 to cut the main restricting tether 53 to cause the main airbag body 52 to further deploy, thereby protecting the occupant P.

Operations of Occupant Protection Device 101

Now, operations of the occupant protection device 101 thus configured are described.

FIG. 4A to FIG. 4D are side views and illustrate the course of deployment of airbag bodies (main airbag body 52 and arm-push-away airbag body 54). FIG. 5 is a flowchart illustrating overall operations of the occupant protection device 101.

In the occupant protection device 101, a control process illustrated in FIG. 5 is regularly performed by the controller 110 at predetermined intervals.

In the control process, the controller 110 first performs a collision prediction process (step S101). For example, the controller 110 predicts a collision of the vehicle 1 on the basis of information input from the onboard camera 31 and the radar 32. In addition to this collision prediction, the controller 110 also performs a collision determination process for the vehicle 1. In a case where the controller 110 detects a collision of the vehicle 1, the controller 110 may perform a process similar to a process described below that is performed at the time when a collision is predicted; however, it is desirable to perform a process that is performed at the time of a collision. In the process that is performed at the time of a collision, for example, the controller 110 causes the main airbag body 52 to deploy at a stroke so as to transition to the maximum deployment state without causing the arm-push-away airbag body 54 to deploy.

Next, the controller 110 determines whether collision prediction of the vehicle 1 is detected (step S102). That is, the controller 110 determines whether a collision of the vehicle 1 is predicted in the collision prediction process.

In a case where the controller 110 determines that a collision is predicted (YES in step S102), the flow proceeds to step S103. In a case where the controller 110 determines that no collision is predicted (NO in step S102), the control process ends.

When detecting collision prediction of the vehicle 1, the controller 110 performs a process for causing the first deployment part to deploy (step S103). For example, the controller 110 transmits an activation signal to the inflator 51 of the main airbag device 50 to cause ignition to occur and to generate gas. In the main airbag device 50, when the inflator 51 generates gas, the gas is injected into the main airbag body 52, and the main airbag body 52 deploys toward the front of the occupant P.

At this stage, the controller 110 does not cause the inflator 51 to cut the main restricting tether 53. That is, the main airbag body 52 deploys while restricted by the main restricting tether 53 in the first deployment state. At this time, the occupant P is not yet restrained. Further, at this stage, the controller 110 does not cause the inflator 51 to cut the arm-push-away restricting tether 55. Therefore, the arm-push-away airbag body 54 does not yet deploy. Accordingly, in response to detection of collision prediction of the vehicle 1, the controller 110 can cause the main airbag body 52 to deploy above the position of the arms of the occupant P without restraining the occupant P.

Next, the controller 110 performs a process for causing the arm-push-away airbag body 54 to deploy to push the arms of the occupant P away (step S104). For example, the controller 110 causes the inflator 51 of the main airbag device 50 to cut the arm-push-away restricting tether 55. Accordingly, restriction by the arm-push-away restricting tether 55 is removed, the gas injected into the main airbag body 52 flows into the arm-push-away airbag body 54, and the arm-push-away airbag body 54 inflates and deploys downward. Consequently, the arms of the occupant P are pushed away downward. The left arm-push-away airbag body 54L and the right arm-push-away airbag body 54R inflate and deploy outward to the left and to the right respectively. Consequently, the arms of the occupant P can be flicked and removed from the deployment area of the main airbag body 52.

The controller 110 may cause the arm-push-away airbag body 54 to deploy toward the position of the arms of the occupant P detected from information input from the onboard camera 31.

Next, the controller 110 performs a process for causing the second deployment part to deploy to protect the occupant P (step S105). For example, the controller 110 causes the inflator 51 of the main airbag device 50 to cut the main restricting tether 53. Accordingly, restriction by the main restricting tether 53 is removed, the second deployment part deploys, and the main airbag body 52 transitions to the maximum deployment state from the first deployment state and deploys just ahead of the upper body and head of the occupant P.

When the main restricting tether 53 is cut, the main airbag body 52 may be caused to deploy only with the gas inside the main airbag body 52. However, when the inflator 51 causes the gas to continuously flow into the main airbag body 52, the main airbag body 52 can be caused to rapidly deploy.

Similarly, when the arm-push-away restricting tether 55 is cut, the arm-push-away airbag body 54 may be caused to deploy only with the gas inside the main airbag body 52. However, when the inflator 51 causes the gas to continuously flow into the main airbag body 52, the arm-push-away airbag body 54 can be caused to rapidly deploy.

As described above, the occupant protection device 101 according to this embodiment transitions to the first deployment state where only the first deployment part of the main airbag body 52 deploys, subsequently transitions to an arm-push-away state to push the arms of the occupant P away, and thereafter, transitions to the maximum deployment state where both the first deployment part and the second deployment part of the main airbag body 52 deploy to protect the occupant P. Accordingly, the arm-push-away airbag body 54 pushes the arms of the occupant P away, and the main airbag body 52 deploys toward the upper body of the occupant P whose arms have been pushed away, which enables optimum protection of the occupant P. That is, even in a case where the occupant P is holding a portable terminal or the like, the arm-push-away airbag body 54 removes their arms from the deployment area of the main airbag body 52. Accordingly, the occupant P can be appropriately protected without the arms of the occupant P being pressed against their upper body by the main airbag body 52.

Second Embodiment

The occupant protection device 101 according to the second embodiment is similar to the occupant protection device 101 according to the first embodiment except a difference in the configuration of the main airbag device 50. In the following description, an element corresponding to that in the first embodiment is assigned the same reference numeral as in the first embodiment, and a description thereof is omitted.

Figure 6A:
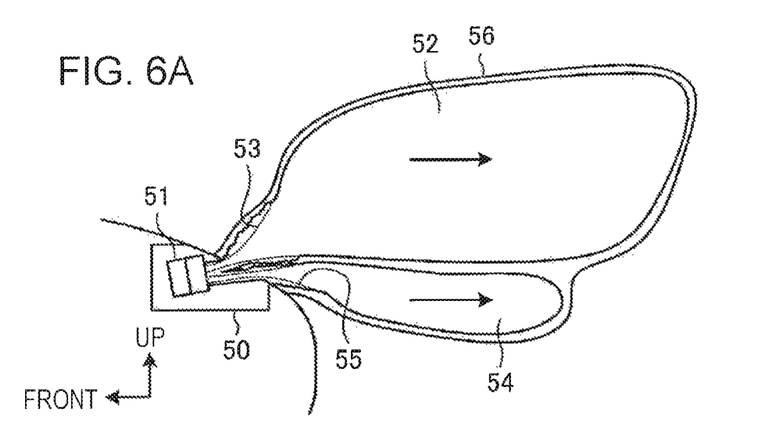
FIG. 6A to FIG. 6C are diagrams schematically illustrating the main airbag device according to another embodiment.
Figure 6B:
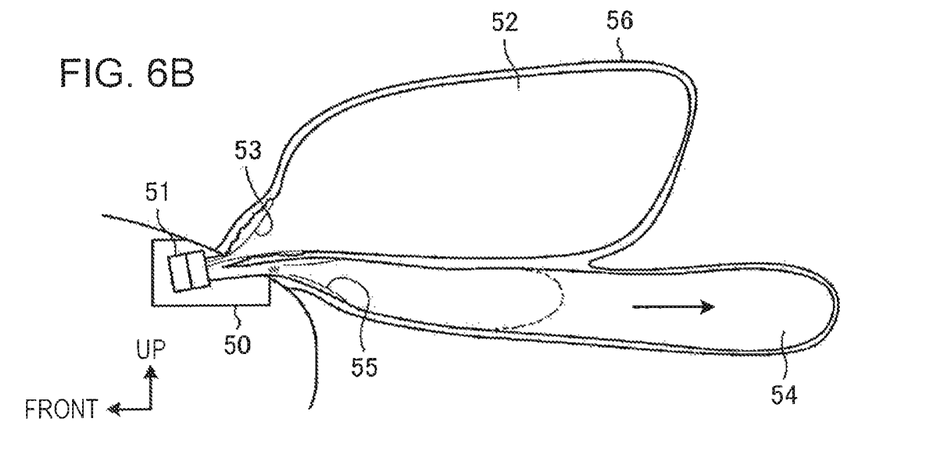
Figure 6C:
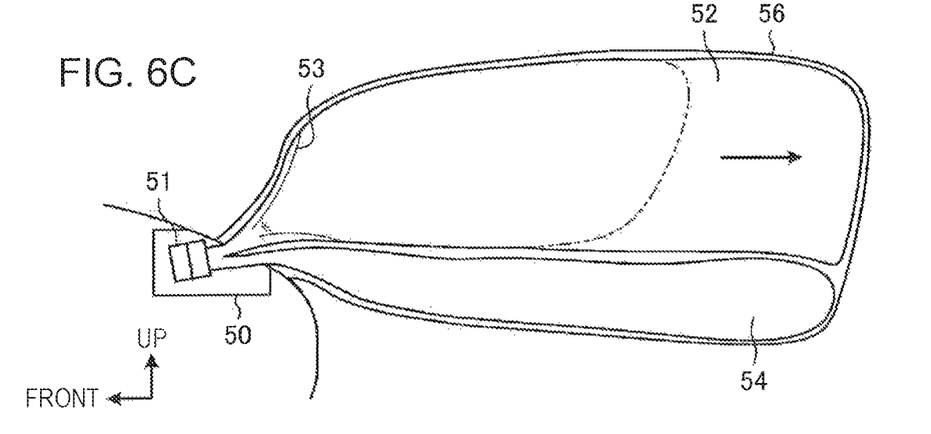

As illustrated in FIG. 6A to FIG. 6C, the main airbag device 50 according to this embodiment includes the inflator 51, the main airbag body 52, the main restricting tether 53, the arm-push-away airbag body 54, the arm-push-away restricting tether 55, and an inclusive airbag body 56. That is, unlike the main airbag device 50 according to the first embodiment, the main airbag device 50 according to this embodiment additionally includes the inclusive airbag body 56. Further, the gas directly flows into the arm-push-away airbag body 54 from the inflator 51.

Inflator 51

The inflator 51 ignites gunpowder in response to an activation signal based on collision detection or collision prediction of the vehicle 1 by the controller 110 to generate gas from a chemical reaction caused by burning. The gas generated by the inflator 51 is injected into the main airbag body 52 and the arm-push-away airbag body 54.

The inflator 51 may include an inflator for the main airbag body 52 and an inflator for the arm-push-away airbag body 54 separately.

Main Airbag Body 52

The main airbag body 52 is a bag body into which gas is injected by the inflator 51. The main airbag body 52 is folded up small when not activated. When gas is injected from the inflator 51, the main airbag body 52 inflates and deploys from the dashboard 5 toward the seat 10 to reduce the impact of the collision of the vehicle 1 on the head, chest, and so on of the occupant P. That is, when a collision of the vehicle 1 is predicted by the controller 110, the main airbag body 52 deploys from the front of the vehicle 1 toward the occupant P.

As in the above-described embodiment, the main airbag body 52 is restricted by the main restricting tether 53 such that the deployment range thereof is separated into two stages.

Main Restricting Tether 53

The main restricting tether 53 couples part of the main airbag body 52 and the inflator 51 with each other. Accordingly, the main restricting tether 53 restricts the deployment range of the main airbag body 52. The main restricting tether 53 is cut by the inflator 51 in accordance with control by the controller 110. When the main restricting tether 53 is cut while gas is injected into the main airbag body 52 by the inflator 51, deployment restriction is removed, and the deployment range of the main airbag body 52 is expanded.

Arm-Push-Away Airbag Body 54

The arm-push-away airbag body 54 is a bag body into which gas is injected by the inflator 51, and is folded up small when not activated. When gas is injected from the inflator 51, the arm-push-away airbag body 54 inflates and deploys under the main airbag body 52 from the dashboard 5 toward the seat 10 to push the arms and hands of the occupant P away. That is, when a collision of the vehicle 1 is predicted by the controller 110, the arm-push-away airbag body 54 deploys toward the arms and hands of the occupant P.

The arm-push-away airbag body 54 is restricted by the arm-push-away restricting tether 55 such that the deployment range thereof is separated into two stages.

Arm-Push-Away Restricting Tether 55

The arm-push-away restricting tether 55 couples part of the arm-push-away airbag body 54 (for example, a part near the base of the arm-push-away airbag body 54) and the inflator 51 with each other. Accordingly, the arm-push-away restricting tether 55 restricts deployment of the arm-push-away airbag body 54. The arm-push-away restricting tether 55 is cut by the inflator 51 in accordance with control by the controller 110. When the arm-push-away restricting tether 55 is cut while gas is injected into the arm-push-away airbag body 54 by the inflator 51, deployment restriction is removed, and the deployment range of the arm-push-away airbag body 54 is expanded.

Inclusive Airbag Body 56

The inclusive airbag body 56 is provided so as to enclose the main airbag body 52 and the arm-push-away airbag body 54, and is folded up small until gas from the inflator 51 is injected into the main airbag body 52 and the arm-push-away airbag body 54. Therefore, the inclusive airbag body 56 deploys as the main airbag body 52 and the arm-push-away airbag body 54 inflate and deploy.

A state of the inclusive airbag body 56 where the main airbag body 52 deploys while restricted by the main restricting tether 53 and the arm-push-away airbag body 54 deploys while restricted by the arm-push-away restricting tether 55 corresponds to the first deployment state, and the deploying part of the inclusive airbag body 56 corresponds to the first deployment part. A state of the inclusive airbag body 56 where restriction by the arm-push-away restricting tether 55 is removed and part of the inclusive airbag body 56 in the first deployment state is protruded by the arm-push-away airbag body 54 corresponds to the arm-push-away state, and the protruded deploying part of the inclusive airbag body 56 corresponds to the arm-push-away deployment part. A state of the inclusive airbag body 56 where restriction by the main restricting tether 53 is removed and the entire inclusive airbag body 56 in the arm-push-away state deploys due to deployment of the main airbag body 52 corresponds to the maximum deployment state, and the last deploying part of the inclusive airbag body 56 corresponds to the second deployment part.

Controller 110

The controller 110 controls the main airbag device 50 to deploy the main airbag body 52 and limit (restrict) the deployment. The controller 110 controls the main airbag device 50 to deploy the arm-push-away airbag body 54 and limit (restrict) the deployment. For example, the controller 110 performs activation control for the inflator 51 of the main airbag device 50 and cut control for the main restricting tether 53 and the arm-push-away restricting tether 55. Accordingly, the controller 110 can control deployment of the inclusive airbag body 56.

For example, when predicting a collision of the vehicle 1, the controller 110 activates the inflator 51 to cause the main airbag body 52 and the arm-push-away airbag body 54 to deploy, thereby transitioning the inclusive airbag body 56 to the first deployment state. In this state, the occupant P is not yet restrained.

Subsequently, the controller 110 causes the inflator 51 to cut the arm-push-away restricting tether 55 to transition the inclusive airbag body 56 to the arm-push-away state, thereby pushing the arms of the occupant P away. Thereafter, the controller 110 causes the inflator 51 to cut the main restricting tether 53 to cause the second deployment part of the inclusive airbag body 56 to deploy and transition the inclusive airbag body 56 to the maximum deployment state, thereby protecting the occupant P.

Operations of Occupant Protection Device 101

Now, operations of the occupant protection device 101 thus configured are described.

The controller 110 first performs a collision prediction process to determine whether collision prediction of the vehicle 1 is detected.

As illustrated in FIG. 6A, when detecting collision prediction of the vehicle 1, the controller 110 performs a process for causing the first deployment part to deploy. For example, the controller 110 transmits an activation signal to the inflator 51 of the main airbag device 50 to cause ignition to occur and to generate gas in a state where the controller 110 does not perform cut control for the main restricting tether 53 or the arm-push-away restricting tether 55. In the main airbag device 50, when the inflator 51 generates gas, the gas is injected into the main airbag body 52 and the arm-push-away airbag body 54, the main airbag body 52 and the arm-push-away airbag body 54 inflate and deploy, and the inclusive airbag body 56 deploys toward the front of the occupant P. Accordingly, the inclusive airbag body 56 transitions to the first deployment state.

Next, as illustrated in FIG. 6B, the controller 110 performs a process for causing the arm-push-away deployment part to deploy. For example, the controller 110 causes the inflator 51 of the main airbag device 50 to cut the arm-push-away restricting tether 55. Accordingly, restriction by the arm-push-away restricting tether 55 is removed, and the arm-push-away airbag body 54 further deploys to protrude toward the occupant P from under the main airbag body 52, thereby transitioning the inclusive airbag body 56 to the arm-push-away state. Consequently, the arms of the occupant P are pushed away.

Next, as illustrated in FIG. 6C, the controller 110 performs a process for causing the second deployment part to deploy to protect the occupant P. For example, the controller 110 causes the inflator 51 of the main airbag device 50 to cut the main restricting tether 53. Accordingly, restriction by the main restricting tether 53 is removed, the main airbag body 52 further deploys, and the inclusive airbag body 56 transitions to the maximum deployment state and deploys just ahead of the upper body and head of the occupant P.

As described above, in the occupant protection device 101 according to this embodiment, the inclusive airbag body 56 transitions from the first deployment state to the arm-push-away state to push the arms of the occupant P away, and thereafter, transitions to the maximum deployment state to protect the occupant P. Accordingly, the occupant P can be appropriately protected without the arms of the occupant P being sandwiched between the inclusive airbag body 56 and the upper body of the occupant P.

Third Embodiment

The occupant protection device 101 according to the third embodiment is similar to the occupant protection device 101 according to the first embodiment except a difference in the configuration of the main airbag device 50. In the following description, an element corresponding to that in the first embodiment is assigned the same reference numeral as in the first embodiment, and a description thereof is omitted.

Figure 7A:
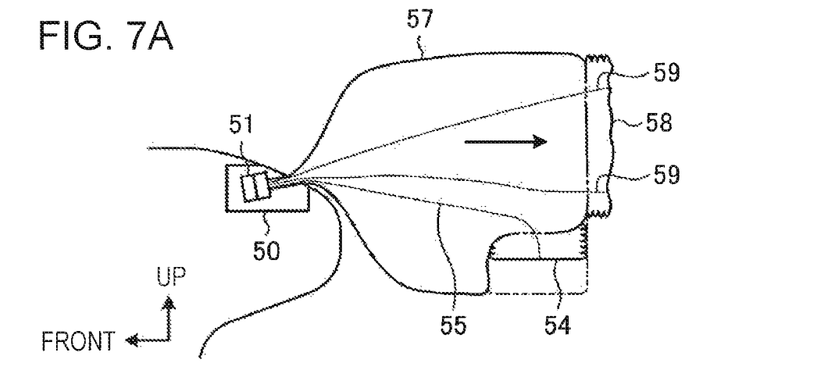
FIG. 7A to FIG. 7C are diagrams schematically illustrating the main airbag device according to still another embodiment.
Figure 7B:
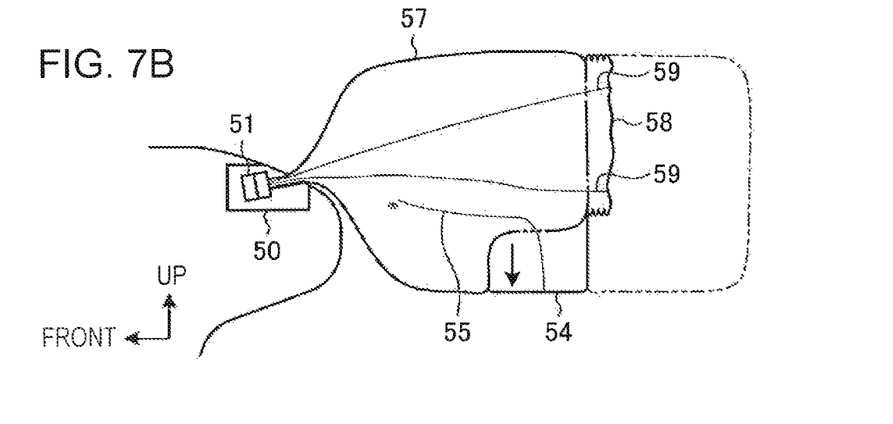
Figure 7C:
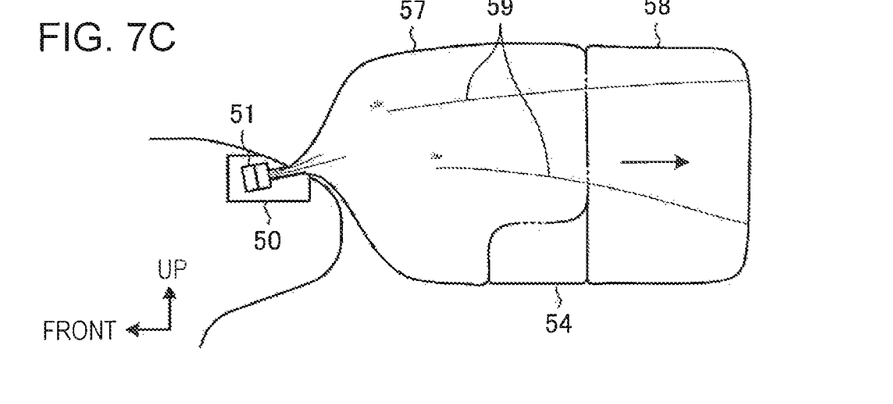

FIG. 7A to FIG. 7C are diagrams schematically illustrating the main airbag device 50 in the occupant protection device 101 according to the third embodiment.

As illustrated in FIG. 7A to FIG. 7C, the main airbag device 50 according to this embodiment includes the inflator 51, the arm-push-away airbag body 54, the arm-push-away restricting tether 55, a first airbag body 57, a second airbag body 58, and a second restricting tether 59. That is unlike the main airbag device 50 according to the first embodiment, the main airbag device 50 according to this embodiment includes the first airbag body 57 and the second airbag body 58 instead of the main airbag body 52. Further, for the second airbag body 58, the second restricting tether 59 is provided instead of the main restricting tether 53.

Inflator 51

The inflator 51 ignites gunpowder in response to an activation signal based on collision detection or collision prediction of the vehicle 1 by the controller 110 to generate gas from a chemical reaction caused by burning. The gas generated by the inflator 51 is injected into the first airbag body 57.

As described below, into the arm-push-away airbag body 54 and the second airbag body 58, the gas is injected via the first airbag body 57.

Arm-Push-Away Airbag Body 54

The arm-push-away airbag body 54 is provided under the first airbag body 57 near the distal end part of the first airbag body 57. The arm-push-away airbag body 54 is a bag body into which gas output from the inflator 51 is injected via the first airbag body 57, and is folded up small when not activated. Deployment of the arm-push-away airbag body 54 is limited also by the arm-push-away restricting tether 55. When restriction by the arm-push-away restricting tether 55 is removed, the arm-push-away airbag body 54 deploys and pushes away the arms of the occupant P downward. That is, the arm-push-away airbag body 54 pushes the arms of the occupant P away. Therefore, the arm-push-away airbag body 54 corresponds to the arm-push-away deployment part.

Arm-Push-Away Restricting Tether 55

The arm-push-away restricting tether 55 couples part of the arm-push-away airbag body 54 (for example, the distal end part of the arm-push-away airbag body 54) and the inflator 51 with each other. Accordingly, the arm-push-away restricting tether 55 restricts deployment of the arm-push-away airbag body 54. The arm-push-away restricting tether 55 is cut by the inflator 51 in accordance with control by the controller 110. When the arm-push-away restricting tether 55 is cut while gas is injected into the first airbag body 57 by the inflator 51, deployment restriction is removed, the gas is injected into the arm-push-away airbag body 54 from the first airbag body 57, and the arm-push-away airbag body 54 deploys. That is, the arm-push-away deployment part deploys.

First Airbag Body 57

The first airbag body 57 is a bag body into which gas is injected by the inflator 51, and is folded up small when not activated. When gas is injected from the inflator 51, the first airbag body 57 inflates and deploys from the dashboard 5 toward the seat 10.

In the main airbag device 50, the first airbag body 57 corresponds to the first deployment part.

Second Airbag Body 58

The second airbag body 58 is provided at the distal end of the first airbag body 57. The second airbag body 58 is a bag body into which gas output from the inflator 51 is injected via the first airbag body 57, and is folded up small when not activated. Deployment of the second airbag body 58 is limited also by the second restricting tether 59. When restriction by the second restricting tether 59 is removed, the second airbag body 58 inflates and deploys toward the seat 10 to reduce the impact of the collision of the vehicle 1 on the head, chest, and so on of the occupant P. At the time of deployment, the second airbag body 58 inflates and deploys toward the seat 10 and also inflates and deploys downward.

In the main airbag device 50, the second airbag body 58 corresponds to the second deployment part.

Second Restricting Tether 59

The second restricting tether 59 couples part of the second airbag body 58 (for example, the distal end part of the second airbag body 58) and the inflator 51 with each other. Accordingly, the second restricting tether 59 restricts deployment of the second airbag body 58. The second restricting tether 59 is cut by the inflator 51 in accordance with control by the controller 110. When the second restricting tether 59 is cut while gas is injected into the first airbag body 57 by the inflator 51, deployment restriction is removed, the gas is injected into the second airbag body 58 from the first airbag body 57, and the second airbag body 58 deploys. That is, the second deployment part deploys.

Controller 110

The controller 110 controls the main airbag device 50 to deploy the arm-push-away airbag body 54, the first airbag body 57, and the second airbag body 58 and limit (restrict) the deployment. For example, the controller 110 performs activation control for the inflator 51 of the main airbag device 50 and cut control for the arm-push-away restricting tether 55 and the second restricting tether 59. Accordingly, the controller 110 can control deployment of the arm-push-away airbag body 54, the first airbag body 57, and the second airbag body 58.

For example, when predicting a collision of the vehicle 1, the controller 110 activates the inflator 51 to cause the first airbag body 57 to deploy so as to transition to the first deployment state. In this state, the occupant P is not yet restrained. Subsequently, the controller 110 causes the inflator 51 to cut the arm-push-away restricting tether 55 to transition the arm-push-away airbag body 54 to the arm-push-away state, thereby pushing the arms of the occupant P away. Thereafter, the controller 110 causes the inflator 51 to cut the second restricting tether 59 to cause the second airbag body 58 to deploy so as to transition to the maximum deployment state, thereby protecting the occupant P.

Operations of Occupant Protection Device 101

Now, operations of the occupant protection device 101 thus configured are described.

The controller 110 first performs a collision prediction process to determine whether collision prediction of the vehicle 1 is detected.

As illustrated in FIG. 7A, when detecting collision prediction of the vehicle 1, the controller 110 performs a process for causing the first deployment part to deploy. For example, the controller 110 transmits an activation signal to the inflator 51 of the main airbag device 50 to cause ignition to occur and to generate gas in a state where the controller 110 does not perform cut control for the arm-push-away restricting tether 55 or the second restricting tether 59. In the main airbag device 50, when the inflator 51 generates gas, the gas is injected into the first airbag body 57, and the first airbag body 57 inflates and deploys toward the front of the occupant P. Accordingly, a transition to the first deployment state occurs.

Next, as illustrated in FIG. 7B, the controller 110 performs a process for causing the arm-push-away deployment part to deploy. For example, the controller 110 causes the inflator 51 of the main airbag device 50 to cut the arm-push-away restricting tether 55. Accordingly, restriction by the arm-push-away restricting tether 55 is removed, and the arm-push-away airbag body 54 inflates and deploys downward to transition to the arm-push-away state, thereby pushing the arms of the occupant P away.

Next, as illustrated in FIG. 7C, the controller 110 performs a process for causing the second deployment part to deploy to protect the occupant P. For example, the controller 110 causes the inflator 51 of the main airbag device 50 to cut the second restricting tether 59. Accordingly, restriction by the second restricting tether 59 is removed, the second airbag body 58 inflates and deploys to transition to the maximum deployment state, and deploys just ahead of the upper body and head of the occupant P.

As described above, in the occupant protection device 101 according to this embodiment, the first deployment part deploys, and thereafter, the arm-push-away deployment part deploys to push the arms of the occupant P away. Subsequently, the second deployment part deploys to transition to the maximum deployment state, thereby protecting the occupant P. Accordingly, the occupant P can be appropriately protected by pushing the arms of the occupant P away.

Fourth Embodiment

The occupant protection device 101 according to the fourth embodiment is similar to the occupant protection device 101 according to the first embodiment except a difference in the configuration of the main airbag device 50. In the following description, an element corresponding to that in the first embodiment is assigned the same reference numeral as in the first embodiment, and a description thereof is omitted.

FIG. 8A-1 to FIG. 8D-2 schematically illustrate the main airbag device 50 in the occupant protection device 101 according to the fourth embodiment.

As illustrated in FIG. 8A-1 to FIG. 8D-2, the main airbag device 50 according to this embodiment includes the inflator 51, the main airbag body 52, the main restricting tether 53, the arm-push-away airbag body 54, and the arm-push-away restricting tether 55. Here, the difference between the main airbag device 50 according to this embodiment and the main airbag device 50 according to the first embodiment is the arm-push-away restricting tether 55.

Arm-Push-Away Restricting Tether 55

Figure 8A:
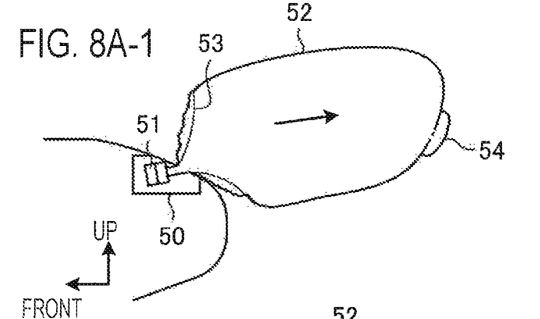
Figure 8A:
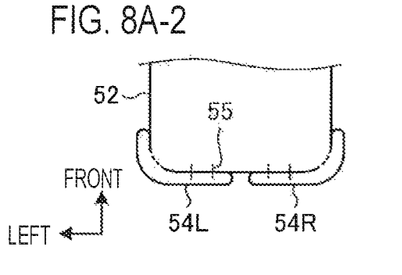
Figures 8B, 8B, 8C, 8C, 8D, 8D:
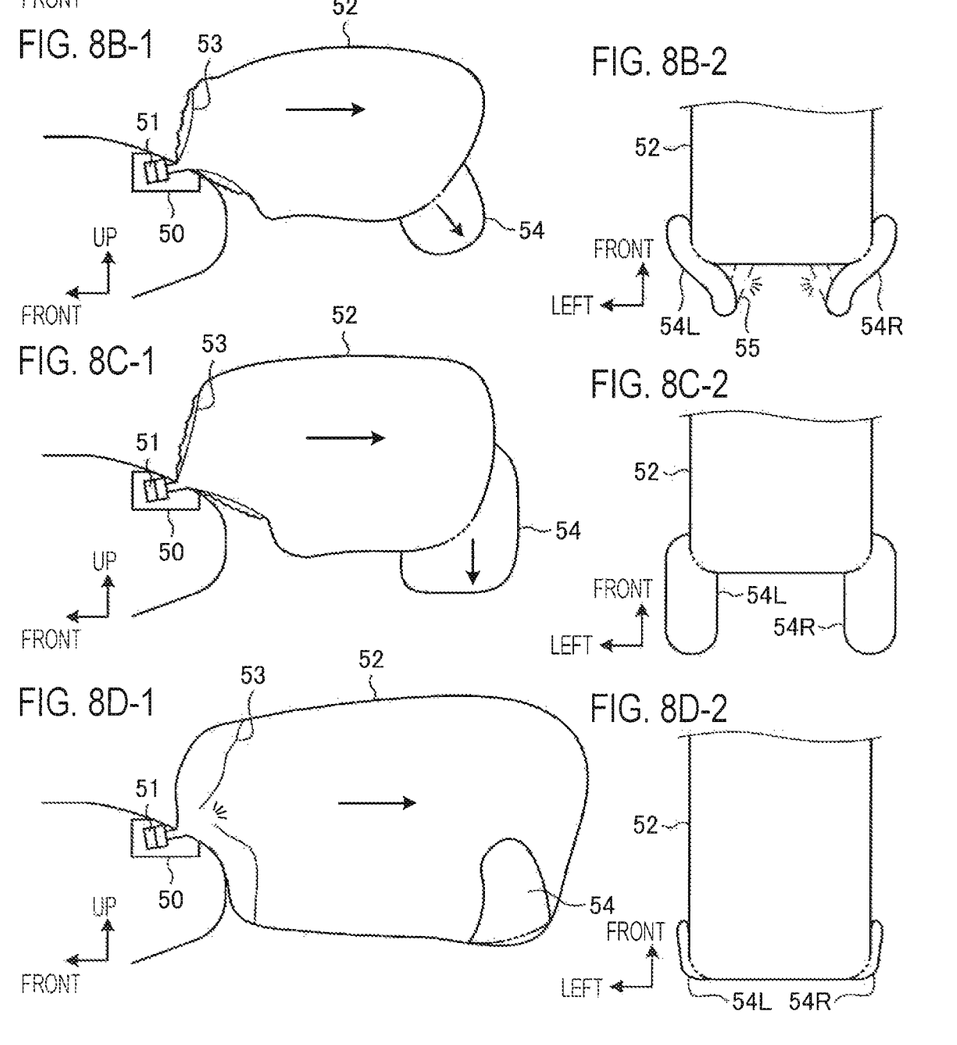

The arm-push-away restricting tether 55 is formed by loosely sewing part of the main airbag body 52 and part of the arm-push-away airbag body 54 together (hereinafter also referred to as loose sewing). That is, the arm-push-away restricting tether 55 is formed by sewing part of a contact part in which the distal end part of the main airbag body 52 and the distal end part of the arm-push-away airbag body 54 are in contact with each other. This sewn part comes apart when strongly pulled. Therefore, when the arm-push-away airbag body 54 inflates and deploys and is almost apart from the main airbag body 52, the arm-push-away restricting tether 55 is cut. Accordingly, the arm-push-away restricting tether 55 is not cut by the inflator 51 in accordance with control by the controller 110 but is cut when gas is sufficiently injected into the arm-push-away airbag body 54 from the inflator 51 via the main airbag body 52.

As described above, in the occupant protection device 101 according to this embodiment, the arm-push-away restricting tether 55 is formed by loose sewing. Therefore, the arm-push-away restricting tether 55 is not cut by the inflator 51 but is cut with increased pressure. Accordingly, the arms of the occupant P can be pushed away without providing a long tether, and the occupant P can be appropriately protected.

Also in the second and third embodiments, the configuration using loose sewing can be employed as in this embodiment. Also in this case, the occupant P can be appropriately protected when a collision of the vehicle 1 is predicted.

In some embodiments, the onboard camera 31 may serve as an "occupant state detecting device". In some embodiments, the controller 110 may serve as a "collision predictor" and a "deployment controller".

In some embodiments, the main airbag body 52 may serve as a "main airbag". In some embodiments, the main restricting tether 53, the arm-push-away restricting tether 55, and the second restricting tether 59 may serve as a "restricting member".

According to embodiments of the disclosure, it is possible to provide an occupant protection device that can provide optimum occupant protection even in a case where an occupant is holding a portable terminal or the like.

The controller 110 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An occupant protection device for a vehicle, the occupant protection device comprising:
    a collision predictor configured to predict a collision of the vehicle;
    a main airbag configured to deploy in a deployment direction toward an occupant from a front of the vehicle when a collision of the vehicle is predicted by the collision predictor, the main airbag comprising a first deployment part, an arm-push-away deployment part, and a second deployment part; and a deployment controller configured to cause the main airbag to deploy toward the occupant when a collision of the vehicle is predicted by the collision predictor, wherein the deployment controller is configured to, when the collision of the vehicle is predicted by the collision predictor, cause the first deployment part to deploy to cause the main airbag to be in a first deployment state, subsequently cause the arm-push-away deployment part to deploy to push arms of the occupant away to cause the main airbag to be in an arm-push-away state, and thereafter, cause the second deployment part to deploy to cause the main airbag to be in a second deployment state, wherein, in the arm-push-away state, the arm-push-away deployment part comprises, at an end of the main airbag in the deployment direction, a protruding part disposed under the first deployment part and protruded from the first deployment part, wherein the protruding part is configured as to enter into a region between the arms of the occupant to move the arms outside a space defined between the first deployment part and an upper body of the occupant while the main airbag is in the arm-push-away state after the first deployment state, and wherein the main airbag is configured as to not restrain the occupant in the first deployment state and the arm-push-away state, and to deploy up to a position to restrain the occupant in the second deployment state.

2. The occupant protection device for a vehicle according to claim 1, further comprising an occupant state detecting device configured to detect a position of the arms of the occupant, wherein the deployment controller causes the first deployment part to deploy, and subsequently causes the arm-push-away deployment part to deploy toward the position of the arms of the occupant detected by the occupant state detecting device.

3. The occupant protection device for a vehicle according to claim 2, wherein the arm-push-away deployment part flicks the arms of the occupant when caused to deploy by the deployment controller.

4. The occupant protection device for a vehicle according to claim 3, wherein deployment of the arm-push-away deployment part and the second deployment part of the main airbag is, at least in the first deployment state, restricted by a restricting member, and the deployment controller removes restriction by the restricting member to allow the arm-push-away deployment part and the second deployment part to deploy.

5. The occupant protection device for a vehicle according to claim 2, wherein deployment of the arm-push-away deployment part and the second deployment part of the main airbag is, at least in the first deployment state, restricted by a restricting member, and the deployment controller removes restriction by the restricting member to allow the arm-push-away deployment part and the second deployment part to deploy.

6. The occupant protection device for a vehicle according to claim 1, wherein the arm-push-away deployment part flicks the arms of the occupant when caused to deploy by the deployment controller.

7. The occupant protection device for a vehicle according to claim 6, wherein deployment of the arm-push-away deployment part and the second deployment part of the main airbag is, at least in the first deployment state, restricted by a restricting member, and the deployment controller removes restriction by the restricting member to allow the arm-push-away deployment part and the second deployment part to deploy.

8. The occupant protection device for a vehicle according to claim 1, wherein deployment of the arm-push-away deployment part and the second deployment part of the main airbag is, at least in the first deployment state, restricted by a restricting member, and the deployment controller removes restriction by the restricting member to allow the arm-push-away deployment part and the second deployment part to deploy.

9. The occupant protection device for a vehicle according to claim 1, wherein the protruding part comprises a first arm and a second arm, wherein, when the main airbag is in the first deployment state, the first arm and the second arm are disposed along a lower surface of the first deployment part, a tip end portion of the first arm is disposed at a right side of the vehicle with respect to a base end portion of the first arm, and a tip end portion of the second arm is disposed at a left side of the vehicle with respect to a base end portion of the second arm, and wherein, while the main airbag is in the arm-push-away state after the first deployment state, the tip end portion of the first arm moves around the base end portion of the first arm passing under the base end portion of the first arm until the tip end portion of the first arm reaches the left side, and the tip end portion of the second arm moves around the base end portion of the second arm passing under the base end portion of the second arm until the tip end portion of the second arm reaches the right side.

10. The occupant protection device for a vehicle according to claim 9, further comprising:

a first restricting member that holds the first arm and the second arm in a position along a lower surface of the first deployment part when the main airbag is in the first deployment state; and a second restricting member that restricts deployment of the second deployment part when the main airbag is in the first deployment state, wherein, after the main airbag is in the first deployment state, the deployment controller releases holding of the first arm and the second arm by the first restriction member, and then removes restriction of the deployment of the second deployment part by the second restriction member.

11. The occupant protection device for a vehicle according to claim 1, wherein each of the first deployment part and the second deployment part share a common principal deployment direction.

12. The occupant protection device for a vehicle according to claim 1, wherein each of the first deployment part and second deployment part share a common rearward most main airbag surface in respective states of full extension.

13. An occupant protection device for a vehicle, the occupant protection device comprising:

a main airbag configured to deploy in a deployment direction toward an occupant from a front of the vehicle when a collision of the vehicle is predicted, the main airbag comprising a first deployment part, an arm-push-away deployment part, and a second deployment part; and circuitry configured to
- predict a collision of the vehicle,
- cause the main airbag to deploy toward the occupant when a collision of the vehicle is predicted, and
- when the collision of the vehicle is predicted, cause the first deployment part to deploy to cause the main airbag to be in a first deployment state, subsequently cause the arm-push-away deployment part to deploy to push arms of the occupant away to cause the main airbag to be in an arm-push-away state, and thereafter, cause the second deployment part to deploy to cause the main airbag to be in a second deployment state, wherein, in the arm-push-away state, the arm-push-away deployment part comprises, at an end of the main airbag in the deployment direction, a protruding part disposed under the first deployment part and protruded from the first deployment part, wherein the protruding part is configured as to enter into a region between the arms of the occupant to move the arms outside a space defined between the first deployment part and an upper body of the occupant while the main airbag is in the arm-push-away state after the first deployment state, and wherein the main airbag is configured as to not restrain the occupant in the first deployment state and the arm-push-away state, and to deploy up to a position to restrain the occupant in the second deployment state.

14. The occupant protection device for a vehicle according to claim 13, wherein each of the first deployment part and the second deployment part share a common principal deployment direction.

15. The occupant protection device for a vehicle according to claim 13, wherein each of the first deployment part and second deployment part share a common rearward most main airbag surface in respective states of full extension.

* * * * *